Feb. 28, 1956 E. S. COOK ET AL 2,736,612
LOAD COMPENSATING BRAKE APPARATUS
Filed Aug. 9, 1951
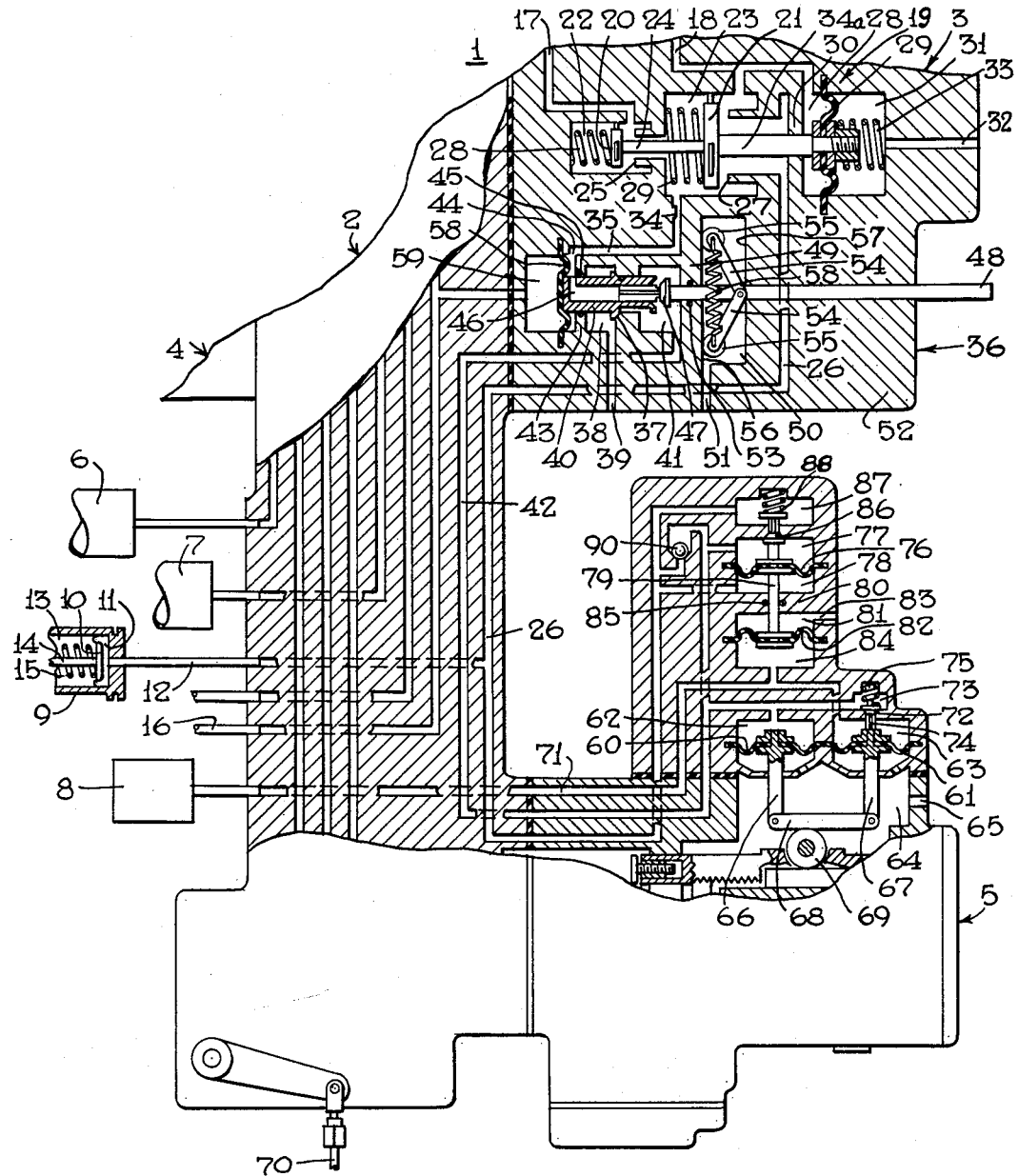
INVENTORS
Earle S. Cook
Ralph T. Whitney
BY
Adelbert A. Steinmiller
ATTORNEY though # United States Patent Office 2,736,612
Patented Feb. 28, 1956

2,736,612

LOAD COMPENSATING BRAKE APPARATUS

Earle S. Cook, Forest Hills, and Ralph T. Whitney, Irwin, Pa., assignors to Westinghouse Air Brake Company, Wilmerding, Pa., a corporation of Pennsylvania Application August 9, 1951, Serial No. 241,144

7 Claims. (Cl. 303—22)

This invention relates to fluid pressure brakes and more particularly to the type for varying the degree of brake application on a vehicle in proportion to the load carried by the vehicle.

It has heretofore been proposed to vary the pressure of fluid obtained from an auxiliary reservoir in a brake cylinder device of the single pressure chamber type in accordance with the load on a vehicle in order to obtain the same degree of braking of the vehicle whether empty or loaded and regardless of the degree of load. With such proposals, if a vehicle were fully loaded, the auxiliary reservoir when charged to a normal pressure of seventy pounds would equalize into the brake cylinder device at fifty pounds upon a full service reduction in brake pipe pressure to provide the desired full service degree of braking of the fully loaded vehicle, but means were provided in one form or another whereby the same amount of fluid under pressure from the auxiliary reservoir would result in a lower brake cylinder pressure for an empty vehicle or a vehicle less than fully loaded to provide the same degree of braking as with the vehicle fully loaded. For example, if the vehicle were empty a full service reduction in pressure in the brake pipe and auxiliary reservoir to fifty pounds might result in twenty-five pounds pressure in the brake cylinder device. If the vehicle were loaded to any degree less than full load, a proportional pressure would be obtained in the brake cylinder device upon a full service reduction in auxiliary reservoir pressure. In other words, in all instances except when the vehicle were fully loaded, the pressure obtained in the brake cylinder device upon a full service reduction in auxiliary reservoir pressure would be lower than the pressure remaining in said reservoir so that if a further or over-service reduction in brake pipe pressure occurred, the brake cylinder pressure would be increased above the full service application and finally up to equalization with the pressure in the auxiliary reservoir. This is undesirable, for if an overreduction in brake pipe pressure were made on a train of mixed empty and loaded vehicles, only the fully loaded vehicles would be braked to the intended full service degree while all other vehicles would be overbraked.

The principal object of the invention therefore is the provision of an improved, relatively simple brake equipment of the above general type which upon an overreduction in brake pipe pressure will limit the braking of a vehicle to a full service degree regardless of the loaded condition of the vehicle.

Other objects and advantages will become apparent from the following more detailed description of the invention.

In the accompanying drawing, the single figure is a diagrammatic view, partly in section, of a portion of a fluid pressure brake apparatus embodying the invention.

Description

As shown in the drawing, reference numeral 1 designates generally a brake controlling valve device comprising a pipe bracket 2, and service and emergency application portions 3 and 4 mounted on opposite sides of said bracket, respectively. The numeral 5 designates a load control valve device, embodying the invention, mounted on a third face of pipe bracket 2. The brake apparatus further comprises an auxiliary reservoir 6, emergency reservoir 7, a volume reservoir 8 and a brake cylinder device 9.

The brake cylinder device 9 is of the usual type comprising a casing containing a piston 10 at one side of which is a pressure chamber 11 connected by a brake cylinder pipe 12 to the bracket 2 while at the opposite side is the usual non-pressure chamber 13. A rod 14 projects from piston 10 through the non-pressure chamber 13 for operation by said piston upon movement by fluid under pressure supplied to chamber 11, in a manner to be later described, to apply brakes on a vehicle. Upon release of fluid under pressure from chamber 11, a release spring 15 in chamber 13 is adapted to return piston 10 and rod 14 to a brake release position, in which they are shown in the drawing, to effect a release of brakes on the vehicle.

The service and emergency application portions 3 and 4 of the brake controlling valve device 1 may be the same as disclosed in the pending application of Earle S. Cook, Serial No. 238,918, filed July 27, 1951, and assigned to the assignee of the present application. In view of this, only so much of the service and emergency application portions 3 and 4 are shown in the drawing as deemed necessary to an understanding of the invention.

As described in the pending Cook application, the service application portion 3 is adapted to operate upon a service reduction in pressure in a brake pipe 16 to open said brake pipe to a passage 17 for effecting a quick service reduction in brake pipe pressure and at the same time supply fluid under pressure from the auxiliary reservoir 6 to a passage 18 for effecting a service application of brakes. Upon an emergency reduction in pressure in brake pipe 16, the service application portion 3 is adapted to operate the same as upon a service reduction in brake pipe pressure, but the emergency portion 4 will also operate to supply fluid under pressure from the emergency reservoir 7 to passage 18 to provide an emergency application of brakes. Upon recharging the brake pipe 16 with fluid under pressure, the service and emergency portions 3, 4 will return to normal position in which fluid will be released from passage 18 to effect a release of brakes and the auxiliary reservoir 6 and emergency reservoir 7 will be recharged with fluid from the brake pipe 16. It is to be understood that the application and release of brakes is effected by supply and release, respectively, of fluid under pressure to and from the pressure chamber 11 in the brake cylinder device 9 which occurs upon supply and release of fluid under pressure to and from passage 18, as will hereinafter be described in greater detail.

The numeral 19 designates a combined quick service and emergency inshot valve mechanism which comprises two check valves 20 and 21 contained in chambers 22, 23 and connected by a stem 24 for movement in unison. The check valve 20 controls communication between chamber 22, to which the quick service passage 17 is connected, and chamber 23 and is arranged to cooperate with a seat 25 to close such communication. The check valve 21 is arranged to control communication between chamber 23, to which passage 18 is connected, and a passage 26 which is connected to the brake cylinder pipe 12, and is arranged to cooperate with a seat 27 to close such communication, it being noted that the two check valves 20, 21 seat in the same direction and are adapted to seat at the same time upon movement in the direction of the right hand. Springs 28, 29 contained in chambers 22, 23 and acting on the check valves 20, 21, respectively, are provided for seating said check valves.

The passage 18 to which fluid under pressure is supplied for effecting an application of brakes is also connected to a chamber 28 provided between a flexible diaphragm 29 and a wall 30. At the opposite side of diaphragm 29 is a chamber 31 open to atmosphere through a vent 32 and containing a spring 33 acting on the diaphragm urging it in the direction of check valves 20, 21, all of which are arranged in coaxial relation. Projecting from diaphragm 29 through a bore in partition wall 30 and through passage 26 into contact with check valve 21 is a stem 34a. The pressure of spring 33 is such as to hold the check valves 21, 22 unseated when pressure of fluid in chamber 28 and passage 18 is less than a chosen degree, such as ten pounds, but to permit deflection of said diaphragm against said spring and thereby seating of check valves 20, 21 by their respective springs 28, 29 when pressure in passage 18 and chamber 28 equals and exceeds said chosen degree.

It will therefore be seen that upon a service reduction in brake pipe pressure and thereby operation of the service application portion 3, quick service venting of fluid under pressure from the brake pipe will occur through passage 17, past valve 20 to chamber 23 and thence through passage 26 and pipe 12 to the brake cylinder pressure chamber 11 until the pressure of fluid obtained from the auxiliary reservoir 6 in passage 18 and chamber 28 becomes built up to the degree necessary to deflect diaphragm 29 against spring 33 to permit seating of check valve 20 to terminate the quick service reduction in pressure in the brake pipe 16.

Upon an emergency reduction in pressure in brake pipe 16 there will be a rapid flow of fluid under pressure (termed the emergency inshot) from both the auxiliary reservoir 6 and emergency reservoir 7 through passage 18 and past check valve 21 to passage 26 and thence to the brake cylinder pressure chamber 11 until sufficient pressure is obtained in chamber 28 to deflect diaphragm 29 against spring 33 to permit closing of check valve 21 which terminates such inshot.

After the check valves 20 and 21 seat in effecting a service application of brakes (the seating of check valve 20 terminating quick service) fluid supplied to passage 18 and chamber 23 will continue to flow from passage 18 through an emergency delay choke 34 to a passage 35, while after seating of said check valves in effecting an emergency application of brakes (the seating of check valve 21 under this condition terminating the emergency inshot) the fluid supplied to passage 18 will likewise continue to flow through choke 34 to passage 35, the fluid thus supplied to passage 35 being adapted to increase the pressure in the brake cylinder pressure chamber 11 to a degree according to the loaded condition of the vehicle, as will be described in greater detail later.

It is however desired to point out that the passage 26 which provides for the inshot of fluid under pressure to the brake cylinder device has relatively great capacity to permit such supply at a desired fast rate while the capacity of the communication containing choke 34 is relatively small to provide a desired retarded rate of supply of fluid under pressure to the brake cylinder device after the inshot in effecting an emergency application of brakes. The choke 34 offers no material restriction to flow of fluid under pressure to the brake cylinder device 9 in effecting a service application of brakes.

The numeral 36 designates a manually operative brake release and reapplication valve device which may be the same as that described in the aforementioned Cook application. This device comprises a valve 37 contained in a chamber 38 which is open to atmosphere via port 39, said valve being provided on a plunger 40 which is slidably mounted in the casing of the device, and being arranged to control communication between said chamber and a chamber 41 open to a passage 42 which is adapted to be open to the brake cylinder pressure chamber 11, as will be later described. The plunger 40 extends from chamber 38 through a partition wall 43 into a chamber 44 open to passage 35 and a seal 45 in said wall engaging the exterior of said plunger serves to prevent leakage of fluid under pressure from chamber 44 to chamber 38 and hence atmosphere. A passage 46 in plunger 40 is open at one end to chamber 44 and at the opposite end opens through a valve seat provided on the end of said plunger in chamber 41 for cooperation with a valve 47. The valve 47 is carried by a stem 48 extending through a partition wall 49 into a chamber 50 which is open to atmosphere through a passage 51 and thence through a wall 52 to the exterior of the device for operation by hand. A seal 53 in wall 49 engages the peripheral surface of stem 48 for preventing leakage of fluid under pressure from chamber 41 to atmosphere via chamber 51.

Chamber 50 contains a biasing device for holding the stem 48 and valve 47 in either of two positions, said device comprising two oppositely extending toggle arms 54 pivotally connected at their adjacent ends to the stem 48 and in the opposite end of each is a roller 55 arranged to engage either of two opposite end walls 56, 57 of chamber 50. A spring 58 under tension connects the opposite ends of the two arms 54 to each other. It will be seen that with the parts in the position in which they are shown in the drawing, spring 58 will hold the valve 47 open to permit seating of valve 37. Upon movement of stem 48 inwardly of the device, the line of action of spring 58 on rollers 55 will be transferred to the opposite side of the point of connection of arms 54 with said stem, this operation seating valve 47 on plunger 40 and then actuating said plunger to unseat valve 37 in which condition said valves will remain under the action of spring 48.

One wall of chamber 44 is defined by a flexible diaphragm 58 one side of which is subject to pressure of fluid in chamber 44 and adapted to engage the end of plunger 40 while at the opposite side is a chamber 59 open to brake pipe 16. When the brake pipe 16 is charged with fluid under pressure, the pressure of such fluid in chamber 59 is adapted to deflect diaphragm 58 to seat valve 37 and switch the toggle arms 54 to the position in which they are shown in the drawing for unseating valve 47 so as to open passage 35 to passage 42. When the brake pipe 16 is void of fluid under pressure however, as after effecting an emergency application of brakes, the pressure of diaphragm 58 being relieved on the end of plunger 40, manual operation of rod 48 can seat valve 47 and open valve 37 for thereby closing communication between passage 35 and passage 42 and opening the latter passage to atmosphere for releasing fluid under pressure from the brake cylinder pressure chamber 11, via a communication to be later described, to thereby effect a release of brakes without dissipating fluid under pressure still present in the auxiliary reservoir 6. Subsequent manual operation of rod 48 can unseat valve 47 and permit seating of valve 37 by pressure of fluid remaining in chamber 44, whereupon fluid under pressure will flow from passage 35 to passage 42 to reapply the brakes. With the brake pipe 16 vented, the brakes on the car may be thus alternately released and reapplied as long as sufficient pressure of fluid remains in the auxiliary reservoir 6 and upon recharging the brake pipe 16 with fluid under pressure the diaphragm 58 will automatically close valve 37 and cause opening of valve 47 to ensure automatic application of brakes on the vehicle upon a subsequent reduction in brake pipe pressure.

The passage 42 leads to the load control valve device 5 which in effecting an application of brakes, is adapted to operate after closing of the check valves 20, 21 to limit the pressure of fluid obtained in the brake cylinder pressure chamber 11 according to the loaded condition of the vehicle, as will now be described.

The load control device 5 comprises two flexible diaphragms 60, 61 arranged side by side and subject on their upper side to pressure of fluid in chambers 62, 63, respectively. The opposite side of both diaphragms 60, 61 is subject to atmospheric pressure in a chamber 64 which is open to atmosphere via a vent 65. The diaphragms 60, 61 are connected by stems 66, 67, extending into chamber 64 to opposite ends, respectively, of a scale beam 68 which is supported on a fulcrum roller 69. The roller 69 is adjustable relative to the scale beam 68 to any position, according to the load on a vehicle, between and including, for example, the position in which it is shown in the drawing between the connections of said beam with the stems 66, 67 and a position in which said roller will be disposed directly beneath the connection with stem 66, the position in which said roller is shown in the drawing corresponding to an empty vehicle and that directly beneath stem 66 corresponding to a fully loaded vehicle, while intermediate positions will correspond to different partial degrees of load on the vehicle. The roller 69 may be thus adjusted by apparatus including a strut rod 70 which is arranged to cooperate with an unsprung portion (not shown) of the vehicle upon initial charging of brake pipe 16. Such apparatus may be the same as that disclosed in United States Patent No. 2,482,246 issued on September 20, 1949, to Glenn T. McClure and Earle S. Cook, and further description thereof is not deemed essential in the present application to an understanding of the invention.

The diaphragm chamber 62 is open to passage 42 while diaphragm chamber 63 is open through a passage 71 to the volume reservoir 8, the volume of which is preferably the same as the displacement volume created by the brake cylinder piston 10 in effecting an application of brakes. A valve 72 contained in a chamber 73 open to passage 42 has a stem 74 extending into chamber 63 for operation by upward deflection of diaphragm 61 to open said valve. With the diaphragm 61 in the position in which it is shown in the drawing, a light spring 75 in chamber 73 will seat the valve 72. It will be seen that when fluid under pressure is supplied to passage 42 as above described to effect an application of brakes, such fluid will become effective in chamber 62 and exert a downward force on diaphragm 60. If roller 69 is in any position out from under the end of stem 66, such force will actuate diaphragm 60 to rock lever 68 about said roller to thereby open valve 72. Fluid from passage 42 will then flow past valve 72 to chamber 63 and the volume reservoir 8 until the pressure of such fluid in chamber 63 acting on diaphragm 61 becomes such as to counterbalance the pressure of fluid in chamber 62 acting on diaphragm 60 whereupon spring 75 will seat valve 72. If the roller 69 is in empty position, in which it is shown in the drawing, the valve 72 will thus close when the pressure of fluid in volume reservoir 8 and diaphragm chamber 63 is built up to substantially one-half that acting in chamber 62; if the roller is to the left of empty position, the valve 72 will close when the pressure in the volume reservoir 8 is correspondingly less, while if the roller 69 is beneath stem 66, the diaphragm 60 will be held against deflection and the valve 72 will remain seated. Thus the amount and pressure of fluid obtained in volume reservoir 8 upon supply of fluid under pressure to passage 42 in effecting an application of brakes will vary inversely according to the load on a vehicle from zero for a fully loaded car to, for example, one-half that provided in passage 42 for an empty car.

The load control valve device 5 further comprises a flexible diaphragm 76 subject on opposite sides to pressure of fluid in chambers 77, 78 open to passage 42 and the brake cylinder passage 26, respectively. The diaphragm 76 is connected by a stem 79 extending through a partition wall 80 separating chamber 78 from a chamber 81 to another flexible diaphragm 82 which is subject on one side to atmospheric pressure in chamber 81 via a port 83 and on the opposite side to pressure of fluid in a chamber 84 which is open to passage 71 and thereby the volume reservoir 8. A seal 85 in the partition wall 80 engages the surface of stem 79 to prevent leakage of fluid under pressure from chamber 78 to the vented chamber 81.

The chamber 77 contains a valve 86 controlling communication between said chamber and a chamber 87 which is open to brake cylinder passage 26, a light spring 88 in chamber 87 acting on said valve urging it to an open position.

In operation, when fluid under pressure is supplied to passage 42 after closing of the quick service limiting check valve 20 and emergency inshot check valve 21, such fluid will become effective in chamber 77 and deflect the diaphragm 76 downward against brake cylinder pressure in chamber 78 and permit opening of valve 86 to permit flow of fluid under pressure from passage 42 to the brake cylinder passage 26 and thence to the brake cylinder pressure chamber 11. At the same time, fluid will become effective from passage 42 in the volume reservoir 8 and diaphragm chamber 84 at a pressure corresponding to the empty or loaded condition of the vehicle, as above described. The pressure thus provided in chamber 84 coacts with that obtained in the brake cylinder device acting in chamber 78, and when the sum of these two pressures acting on diaphragms 82, 76 becomes increased to a degree sufficient to slightly overbalance that provided through passage 42 to chamber 77 and acting on diaphragm 76, said diaphragm will be deflected to close valve 86 and prevent further flow of fluid under pressure to the brake cylinder pressure chamber to thereby limit the degree of brake application on the vehicle in accordance with the degree of reduction in brake pipe pressure governing the pressure of fluid obtained in passage 42 and the loaded condition of the vehicle governing the pressure of fluid obtained in chamber 84.

To be more specific, let it be assumed that the vehicle is empty and that a full service reduction in brake pipe pressure is effected under which condition the pressure in the auxiliary reservoir 6 should reduce to fifty pounds from a normal seventy pounds. Following closing of the quick service check valve 20 and emergency inshot check valve 21, fluid will flow from the auxiliary reservoir 6 and passage 42 to diaphragm chamber 77 for opening the valve 86 to supply fluid under pressure to the brake cylinder pressure chamber 11. With the fulcrum roller 69 in empty position, fluid will at the same time flow from passage 42 to diaphragm chambers 62, 84 and the volume reservoir 8 until the pressure of such fluid in said chamber 84 and reservoir will become increased to about twenty-five pounds at which time valve 72 will close. Now when brake cylinder pressure acting in chamber 78 is built up by flow from passage 42 past valve 86 to substantially twenty-five pounds, this pressure acting on diaphragm 76 plus that in chamber 84 acting on diaphragm 82 will deflect said diaphragm to close valve 86 against the fifty pounds acting in chamber 77 on diaphragm 76 to thereby limit the pressure obtained in the brake cylinder pressure chamber 11 to twenty-five pounds which is adequate to effect a full service application of the brakes on the empty car, it being noted that the pressure of fluid in passage 42 at this time is fifty pounds the same as in the auxiliary reservoir 6 at the end of the full service reduction in brake pipe pressure.

If the vehicle is fully loaded with the fulcrum roller directly beneath the diaphragm stem 66, then when an application of brakes is effected, the diaphragm 62 can not deflect to open valve 72. Hence under this condition, no fluid under pressure will be supplied to the volume reservoir 8 and diaphragm chamber 84, due to which, the pressure of fluid in the brake cylinder pressure chamber 11 and diaphragm chamber 78 will build up to substantially that in passage 42 without closing of valve 86, that is, fifty pounds pressure will be obtained in the brake cylinder pressure chamber 11, the same as effective in passage 42 and the auxiliary reservoir 6 at the end of a full service reduction in brake pipe pressure.

Now let it be assumed that the vehicle is half loaded, under which condition it might be desired to limit the pressure in the brake cylinder pressure chamber 11 to say thirty-seven and one-half pounds. With the fulcrum roller 69 adjusted for half-load at the time a full service reduction in brake pipe pressure is effected, the valve 72 will close when the pressure obtained in the volume reservoir 8 and diaphragm chambers 63 and 84 is increased to say twelve and one-half pounds. This pressure acting in chamber 84 will require an increase in brake cylinder pressure in chamber 78 to substantially thirty-seven and one-half pounds to seat the valve 86 against the fifty pounds present in passage 42 and chamber 77 whereby the full service degree of brake application will be limited according to the half-loaded condition of the vehicle.

For any degree of load above or below half load but greater than no load and less than full load, the pressure in chamber 84 will be limited accordingly so as to require a build up in pressure in the brake cylinder pressure chamber 11 and diaphragm chamber 78, proportional to the degree of load, for closing valve 86, the pressure of fluid present in passage 42 at the termination of a full service application of brakes always being fifty pounds however regardless of the pressure in the brake cylinder device.

Since the pressure in the auxiliary reservoir 6 at the end of a full service application is fifty pounds the same as acting in passage 42 and diaphragm chambers 62 and 77 and can not be increased above this degree by a further or over reduction in brake pipe pressure, it will be seen that with the improved structure employed in a train of mixed empty and load cars, all cars in the train will be braked to the same degree upon a full service reduction in pressure in brake pipe 16 and will remain braked to said degree even if an over reduction in brake pipe pressure is effected.

If less than a full service reduction in brake pipe pressure is effected, the structure including diaphragms 60, 61, beam 68, roller 69 and valve 72 will proportion the pressure of fluid obtained in chamber 84 according to the degree of brake pipe reduction, as well as the loaded condition of the vehicle, so that the degree of vehicle braking will be correspondingly limited.

In case of an emergency application of brakes, the pressure of fluid will be increased in passage 42 to the usual high emergency pressure by virtue of connecting both the auxiliary reservoir 6 and emergency reservoir 7 to said passage and the pressure in the brake cylinder pressure 11 will be correspondingly increased according to the loaded condition of the vehicle as, it is believed, will be clear from the preceding description.

In order to release the brakes after an application pressure of fluid in brake pipe 16 will be restored causing operation of the brake controlling valve device to vent passage 18 and chamber 23 therein. Pressure in passage 26 will then initially blow the inshot check valve 21 from its seat to permit venting of fluid under pressure from the brake cylinder pressure chamber 11, and chamber 78, 87 in the load control valve device 5. At the same time as such venting occurs, fluid under pressure will be released from diaphragm chamber 62 and valve chamber 73 in the load control valve device 5 via passage 42, past the manually operative release valve 47, passage 35 and choke 34, and if there is any fluid under pressure present in the volume reservoir 8 and diaphragm chamber 84 such will blow the valve 72 from its seat and be dissipated via passage 42. When the pressure of fluid in passage 18 and diaphragm chamber 28 is thus reduced sufficiently spring 33 will deflect diaphragm 29 to unseat the inshot check valve 21 and quick service limiting check valve 20 preparatory to effecting a subsequent application of brakes.

When an application of brakes is in effect on the vehicle with the brake pipe 16 completely vented, pressure of fluid in chamber 44 of the normally operative release valve device will relieve the plunger 40 of thrust from diaphragm 58. If a trainman then desires to release an application of brakes on the vehicle without dissipating the fluid under pressure remaining in the auxiliary reservoir 6, he will push rod 48 into the device to seat valve 47 and then unseat valve 37. The unseating of valve 37 opens passage 42 to the atmospheric port 39 whereby fluid under pressure will be released from chambers 77, 62 and valve chamber 73 and thereby from the volume reservoir 8 via said passage and past the valve 37, whereupon pressure in the brake cylinder pressure chamber 11 will flow back through passage 26 and past a check valve 90 to passage 42 and be dissipated through passage 42, while the closing of valve 47 will hold the pressure still remaining in passages 35, 18 and the auxiliary reservoir 6. If the trainman subsequently desires to reapply the brakes by fluid still remaining in auxiliary reservoir 6, he may pull rod 48 out to permit seating of valve 37 and opening of valve 47 whereupon the brakes on the vehicle will be reapplied by fluid from the auxiliary reservoir 6. The trainman may thus release brakes and reapply brakes on the vehicle until the pressure of fluid in the auxiliary reservoir 6, passage 18 and diaphragm chamber 28 becomes reduced sufficiently for spring 33 to deflect diaphragm 29 to unseat the inshot valve 21 and quick service valve 20. When this occurs any fluid remaining in the passage 18 and auxiliary reservoir 6 will be dissipated along with that from the brake cylinder device 9 via passage 26 upon operation of rod 48 to release brakes on the vehicle.

Passage 26 through which an emergency inshot of fluid under pressure to the brake cylinder pressure chamber 11 occurs must have a capacity of, for example, equivalent to a ¾" orifice, but the slow build up choke 34 may be much smaller, as for instance equivalent to a ¼" orifice or even smaller and it is to be noted that the release control valve device 36 may, by virtue of the inshot check valve 21 remaining seated until auxiliary reservoir pressure in passage 18 is reduced to a low degree, provide the manual control of application and release of brakes as above described, by controlling the relatively small flow communication through passages 35, 42 which permits the valves and other parts of said device to be relatively small. By the same token, the load control valve device 5 being arranged to control the same relatively small flow communication between passage 42 and passage 26 may also be made with relatively small parts which is very important with respect to size and cheapness of the brake controlling valve device 1.

*Summary*

It will now be seen that by the provision of a volume reservoir of substantially the same volume as that created by the piston of a simple, single pressure chamber type of brake cylinder device, upon movement of said piston to effect an application of the brakes, and varying the pressure of fluid obtained in said reservoir from the usual auxiliary reservoir in inverse proportion to the load on a vehicle, and then using the pressures in said reservoir and the brake cylinder device to oppose pressure of fluid supplied from an auxiliary reservoir to effect an application of brakes, the degree of service braking of a vehicle will be varied according to the load on a car and can not be increased above a full service degree even upon an over service reduction in brake pipe pressure.

Having now described our invention, what we claim as new and desire to secure by Letters Patent, is:

1. In a vehicle fluid pressure brake apparatus, in combination, a brake cylinder device, a volume reservoir, a passageway to which fluid under pressure is adapted to be supplied, valve means operative in response to supply of fluid under pressure to said passageway to supply fluid under pressure from said passageway to said brake cylinder device and operative in response to a preponderance of combined pressures in said brake cylinder device and said reservoir over pressure in said passageway to cut-off supply of fluid under pressure from said passageway to said brake cylinder device, a scale beam, two movable abutments connected to spaced apart portions of said beam and subject opposingly to pressures of fluid in said passageway and reservoir, a fulcrum element for said beam, means for adjusting said fulcrum element relative to said beam to vary the leverage of the one of said abutments which is subject to pressure of fluid in said passageway from zero for no load on a vehicle inversely according to the degree of load on said vehicle and valve means operative by said beam upon a preponderance of force created by fluid under pressure acting on the last named abutment over opposing force created by pressure of fluid on the other abutment to supply fluid from said passageway to said reservoir to a pressure to balance pressure of fluid in said passageway acting on the abutment subject to fluid under pressure in said passageway.

2. In a vehicle fluid pressure brake apparatus, in combination, an auxiliary reservoir, a passageway to which said reservoir is adapted to be opened, a brake cylinder device adapted to be operated by fluid under pressure to effect an application of brakes, valve means controlling communication between said passageway and brake cylinder device, movable abutment means subject to pressure of fluid in said passageway opposing pressure of fluid in said brake cylinder device and operative upon supply of fluid under pressure to said passageway to actuate said valve means to open said communication, a volume reservoir, other movable abutment means connected to the first named abutment means and subject to pressure of fluid in said reservoir which pressure coacts with brake cylinder pressure on the first named abutment means and operative when the sum of the effect of such coacting pressures on the respective abutment means substantially equals the effect of pressure of fluid from said passageway acting on the first named abutment means to actuate said valve means to close said communication, and means operative upon supply of fluid under pressure to said passageway to supply fluid to said reservoir to a pressure which varies inversely according to the degree of load on said vehicle.

3. In a fluid pressure brake apparatus, in combination, an auxiliary reservoir, a first passageway to which said reservoir is adapted to be opened, a second passageway of relatively great flow capacity connecting said first passageway to said brake cylinder device, valve means operative in response to a chosen pressure of fluid in said first passageway to close communication from said first passageway to said second passageway, a third passageway of less flow capacity than said second passageway and open to said first passageway, valve means controlling communication between said first and third passageways, movable abutment means subject to pressure of fluid in said third passageway and opposing pressure in said second passageway for operating said valve means to open said communication, a volume reservoir, movable abutment means subject to pressure of fluid in said reservoir which coacts with pressure in said second passageway acting on the first named abutment means for operating said valve means to close said communication when the sum of the effect of the coacting pressures on the two abutment means equals substantially the effect of pressure of fluid in said third passageway on the first named abutment means, valve means for opening said third passageway to said volume reservoir, and means adjustable according to the load on said vehicle for operating the last named valve means to close said reservoir off from said third passageway upon an increase in pressure of fluid in said reservoir which pressure varies inversely according to vehicle load.

4. In a fluid pressure brake apparatus, in combination, an auxiliary reservoir, a first passageway to which said reservoir is adapted to be opened, a second passageway of relatively great flow capacity connecting said first passageway to said brake cylinder device, valve means operative in response to a chosen pressure of fluid in said first passageway to close communication from said first passageway to said second passageway, a third passageway of less flow capacity than said second passageway and open to said first passageway, valve means controlling communication between said first and third passageways, movable abutment means subject to pressure of fluid in said third passageway and opposing pressure in said second passageway for operating said valve means to open said communication, a volume reservoir, movable abutment means subject to pressure of fluid in said reservoir which coacts with pressure in said second passageway acting on the first named abutment means for operating said valve means to close said communication when the sum of the effect of the coacting pressures on the two abutment means equals substantially the effect of pressure of fluid in said third passageway on the first named abutment means, valve means for opening said third passageway to said volume reservoir, means adjustable according to the load on said vehicle for operating the last named valve means to close said reservoir off from said third passageway upon an increase in pressure of fluid in said reservoir which pressure varies inversely according to vehicle load, and manually operative valve means controlling communication through said third passageway between said first passageway and the second named valve means and selectively operative to either open such communication or to close same and vent the portion thereof connected to said second named valve means.

5. In a vehicle fluid pressure brake apparatus, in combination, a brake cylinder device, a passageway to which fluid under pressure is adapted to be supplied for supply to said brake cylinder device to effect an application of brakes, a first valve means for controlling flow of fluid under pressure from said passageway to said brake cylinder device, a volume reservoir, fulcrum means adjustable according to the load on the vehicle, two movable abutments subject respectively to pressures of fluid in said passageway and reservoir, means cooperably connecting said movable abutments and rockable relative to said fulcrum means a degree corresponding to the adjusted position of said fulcrum means, said degree being a maximum when the vehicle is empty and zero when the vehicle is fully loaded, and said movable abutments exerting opposing forces on said connecting means, a second valve means operable by one of said movable abutments upon supply of fluid under pressure to said passageway to connect said passageway to said reservoir for providing in the latter fluid at a pressure directly proportionate to such degree of rockable movement, and means subject to pressure in said brake cylinder device and reservoir and to opposing pressure of fluid in said passageway and operative to actuate said first valve means to cut off flow of fluid under pressure to said brake cylinder device when the combined effect of brake cylinder pressure and reservoir pressure substantially equalizes with the opposing effect of pressure in said passageway.

6. In a vehicle fluid pressure brake apparatus, in combination, a brake cylinder device, a volume reservoir, a passageway to which fluid under pressure is adapted to be supplied, first valve means operative in response to supply of fluid under pressure to said passageway to supply fluid under pressure from said passageway to said brake cylinder device and comprising means operative in response to a preponderance of combined pressures in said brake cylinder device and said reservoir over pressure in said passageway to cut off supply of fluid under pressure from said passageway to said brake cylinder device, second valve means controlling flow of fluid under pressure from said passageway to said reservoir, means adjustably positioned according to the load condition of the vehicle, and means controlled by the adjusted position of the last named means and also by pressures of fluid in said passageway and reservoir and cooperative in response to supply of fluid to said passageway to so control operation of said second valve means as to provide in said reservoir fluid at a pressure inversely proportionate to the load condition of the vehicle.

7. In a vehicle fluid pressure brake apparatus, in combination, a brake cylinder device, a volume reservoir, a passageway to which fluid under pressure is adapted to be supplied for causing an application of brakes and from which fluid under pressure is adapted to be released for causing a release of brakes, valve means operative in response to supply of fluid under pressure to said passageway to supply fluid under pressure from said passageway to said brake cylinder device and including means operative in response to a preponderance of combined pressures in said brake cylinder device and said reservoir over pressure in said passageway to cut off supply of fluid under pressure from said passageway to said brake cylinder device, poppet valve means normally seated and adapted to be unseated when the pressure of fluid in said reservoir exceeds that in said passageway for releasing fluid under pressure from the former to the latter, means adjustably positioned according to the degree of load on the vehicle, means cooperably connected with said adjustable means and subject to pressure in said passageway and to opposing pressure of fluid in said reservoir and cooperative with said adjustable means responsively to charging of said passageway to effect unseating of said poppet valve means for supplying fluid under pressure from said passageway to said reservoir and operative when the pressure of such fluid attains a value corresponding to the adjusted position of said adjustable means to permit seating of said poppet valve means for terminating such supply.

References Cited in the file of this patent
UNITED STATES PATENTS

| | | |
|---|---|---|
| 1,230,949 | Turner et al. | June 26, 1917 |
| 1,720,284 | Maliphant | July 9, 1929 |
| 2,173,928 | Borde et al. | Sept. 26, 1939 |
| 2,450,464 | Bent | Oct. 5, 1948 |